United States Patent
Goering et al.

(10) Patent No.: US 9,605,583 B2
(45) Date of Patent: Mar. 28, 2017

(54) FAN CONTROL SYSTEM AND METHOD

(71) Applicant: Deere & Company, Moline, IL (US)

(72) Inventors: Dick J. Goering, Cedar Falls, IA (US); Jason L. Jirovsky, Grundy Center, IA (US); Alan D. Sheidler, Moline, IL (US)

(73) Assignee: DEERE & COMPANY, Moline, IL (US)

( * ) Notice: Subject to any disclaimer, the term of this patent is extended or adjusted under 35 U.S.C. 154(b) by 63 days.

(21) Appl. No.: 14/640,497

(22) Filed: Mar. 6, 2015

(65) Prior Publication Data

US 2016/0258339 A1 Sep. 8, 2016

(51) Int. Cl.
*F01P 7/04* (2006.01)
*F01P 1/06* (2006.01)
*F01P 5/02* (2006.01)
*A01D 41/127* (2006.01)

(52) U.S. Cl.
CPC ........... *F01P 7/048* (2013.01); *F01P 1/06* (2013.01); *F01P 5/02* (2013.01); *F01P 7/04* (2013.01); *A01D 41/127* (2013.01); *F01P 2025/62* (2013.01); *Y02P 60/142* (2015.11)

(58) Field of Classification Search
CPC ........ F01P 1/06; F01P 5/02; F01P 5/06; F01P 7/04; F01P 7/048; F01P 7/176; A01D 41/12; A01D 41/127
USPC .............. 701/101, 105, 106, 114; 123/41.01, 123/41.11, 41.31, 41.46, 41.49, 41.63
See application file for complete search history.

(56) References Cited

U.S. PATENT DOCUMENTS

| | | | |
|---|---|---|---|
| 6,101,987 A * | 8/2000 | Saur | F01P 7/048 123/41.1 |
| 6,463,891 B2 * | 10/2002 | Algrain | F01P 3/18 123/41.12 |
| 6,772,714 B2 | 8/2004 | Laird et al. | |
| 7,134,406 B1 | 11/2006 | Loes | |
| 7,310,959 B2 * | 12/2007 | Braun | F01P 7/048 123/41.11 |
| 7,863,839 B2 | 1/2011 | Schuricht et al. | |
| 7,945,378 B2 | 5/2011 | Sheidler et al. | |
| 8,522,700 B2 | 9/2013 | Landphair | |
| 8,589,049 B2 | 11/2013 | Craig | |
| 8,596,194 B2 | 12/2013 | Kraus | |
| 8,714,116 B2 * | 5/2014 | Hartman | F01P 7/026 123/41.01 |
| 8,725,361 B2 | 5/2014 | Kellum | |
| 8,726,543 B2 | 5/2014 | Kelly | |
| 2005/0081801 A1 * | 4/2005 | Braun | F01P 7/048 123/41.1 |
| 2009/0025661 A1 * | 1/2009 | Itoga | E02F 9/226 123/41.12 |
| 2009/0062963 A1 | 3/2009 | Hayashi | |
| 2011/0220042 A1 * | 9/2011 | Suzuki | F01P 7/048 123/41.12 |
| 2012/0061069 A1 | 3/2012 | Schwartz | |

(Continued)

*Primary Examiner* — John Kwon
*Assistant Examiner* — Johnny H Hoang

(57) ABSTRACT

A method for controlling a fan. An ECU estimates the time for an engine to reach a substantially decreased engine load relative to a current engine load. The ECU determines whether the time to reach the substantially decreased engine load is within a threshold. And the ECU controls a fan operating characteristic based on whether the time is within the threshold.

20 Claims, 3 Drawing Sheets

(56) References Cited

U.S. PATENT DOCUMENTS

| | | |
|---|---|---|
| 2014/0121931 A1 | 5/2014 | Kellum |
| 2014/0224468 A1 | 8/2014 | Saito |
| 2015/0020775 A1* | 1/2015 | Brinkmann ......... F02D 41/0002 123/435 |
| 2015/0330287 A1* | 11/2015 | Dickerson ................. F01P 5/04 123/41.12 |

* cited by examiner

FAN CONTROL SYSTEM AND METHOD

FIELD OF THE DISCLOSURE

The present disclosure relates to a system and method for controlling a fan.

BACKGROUND OF THE DISCLOSURE

Vehicles powered by internal combustion engines may be cooled by a coolant circulating in jackets surrounding combustion cylinders. The coolant may be heated by the engine and is then cooled for recirculation by a heat exchanger. The heat exchanger may be cooled by air with air flow enhanced by a fan. The fan may be driven by an engine crankshaft, may be electrically driven by the vehicle electric system, or may be driven by a hydraulic system.

Some known methods for controlling a fan speed use a coolant temperature signal for regulating, for example, a fan speed or blade pitch. Such a method my increase the fan speed or the blade pitch, as the coolant temperature increases. For example, when a vehicle experiences a high load, the heat dissipation increases, driving the coolant temperature higher. When this happens, the fan speed or blade pitch is increased to improve air flow and to deal with the higher heat dissipation required in the cooling package. This results in higher fan power needs, which must be provided by the engine. Because the engine is already at, or near, peak load from the work function of the vehicle, the added fan drive power may cause the engine to be overloaded, and the operator may need to slow down or otherwise reduce the vehicle load. At high loads, this reduces productivity and fuel efficiency.

SUMMARY OF THE DISCLOSURE

Disclosed is a method for controlling a fan used to cool an engine. An electronic control unit (ECU) estimates a time for a vehicle to reach a substantially decreased engine load relative to a current engine load. The ECU determines whether the time to reach the substantially decreased engine load is within a threshold. And the ECU controls a fan operating characteristic based on whether the time is within the threshold. For example, if the time is within the threshold, then the ECU may maintain or decrease the fan speed and/or pitch, in contrast to increasing it.

BRIEF DESCRIPTION OF THE DRAWINGS

The detailed description of the drawings refers to the accompanying figures in which.

DETAILED DESCRIPTION OF THE DRAWINGS

Figure 1:
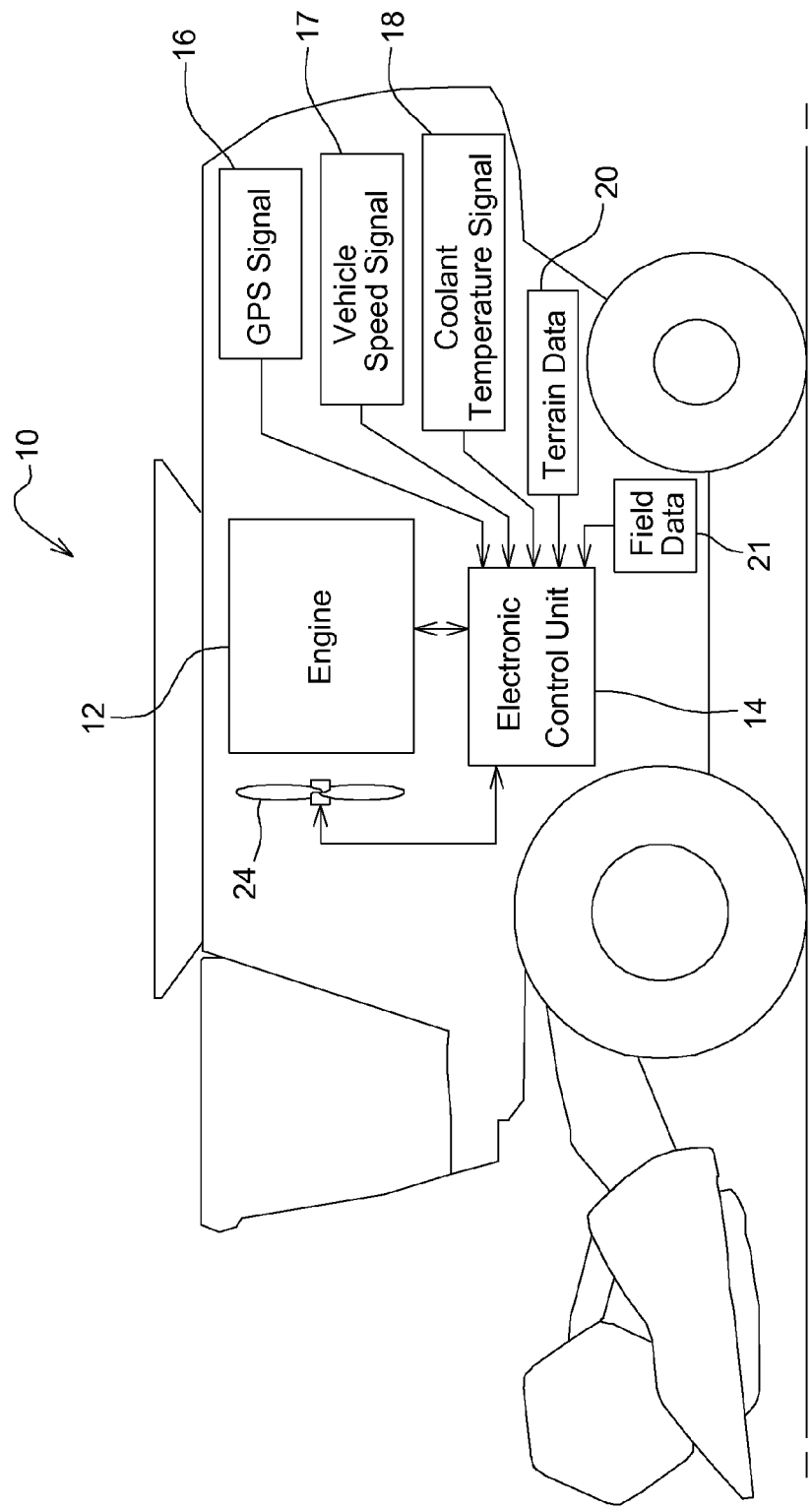
FIG. 1 is a diagrammatic view of an example fan control system.

Referring to FIG. 1, there is shown a schematic illustration of a vehicle 10. An example vehicle 10 is shown in the form of an agricultural combine, though it may be any kind of on-highway or off-highway vehicle. Off-highway vehicles may be in the form of agricultural tractors, construction equipment, and recreational vehicles, to name just a few examples.

The vehicle 10 includes an engine 12. The engine 12 may be an internal combustion engine, such as a gasoline engine, a diesel engine, a natural gas engine, or any other exhaust gas producing engine. The engine 12 may be of any size, have any number cylinders, and be of various configurations (e.g., "V," inline, and radial).

An ECU 14 may be coupled to the engine 12. The ECU 14 may use real time signal inputs from sensor and pre-programmed performance models to control engine functions, such as fuel quantity, injection timing, air-to-fuel ratio, multiple fuel injections, amount of cooled EGR, and a host of other control parameters to deliver peak fuel economy and engine performance as well as emissions management. To name a couple of examples, the ECU 14 may receive a (1) vehicle speed signal 17 associated with the movement of the vehicle 10 and a (2) coolant temperature signal 18. The ECU 14 is meant to be just one representation of one embodiment of a controller. The ECU 14 may take the form of a fan ECU, may be part of a controller area network, or the like.

In some embodiments, the ECU 14 may receive a GPS signal 16 from a GPS unit. The GPS unit may provide the GPS signal 16 based on one or both of a terrestrial source or an extraterrestrial source (e.g., satellite or orbital sources). The GPS data 16 may correspond to one or more of the location, longitude, latitude, speed, velocity, direction, attitude, and altitude of the vehicle 10.

In some embodiments, the ECU 14 may receive terrain data 20 and/or field data 21. The terrain data 20 may include data relating to various locations and may include data related to characteristics of the land or topography, such as surface features. Moreover, terrain data 20 may also include a particular geographic area or region. The terrain data 20 relating to various locations may relate to the GPS data 16, such as, but not limited to, a location determined based on the GPS data 16. The field data 21 may, for example, include field boundary data and crop yield data associated with an agricultural field. In another example, the field data 21 may include data associated with mining locations and transportation routes.

The size and configuration of the fan 24 may vary depending on the application. For example, in some applications the fan 24 may be a "pusher fan," while in others it may be a "puller fan." Further, the fan 24 may be a hydraulically driven fan or a mechanically driven fan, both of which may provide variable operating speeds. In some embodiments, the fan 24 may have blades that vary in pitch, so as to adjust the air flow provided at a given speed.

Figure 2:
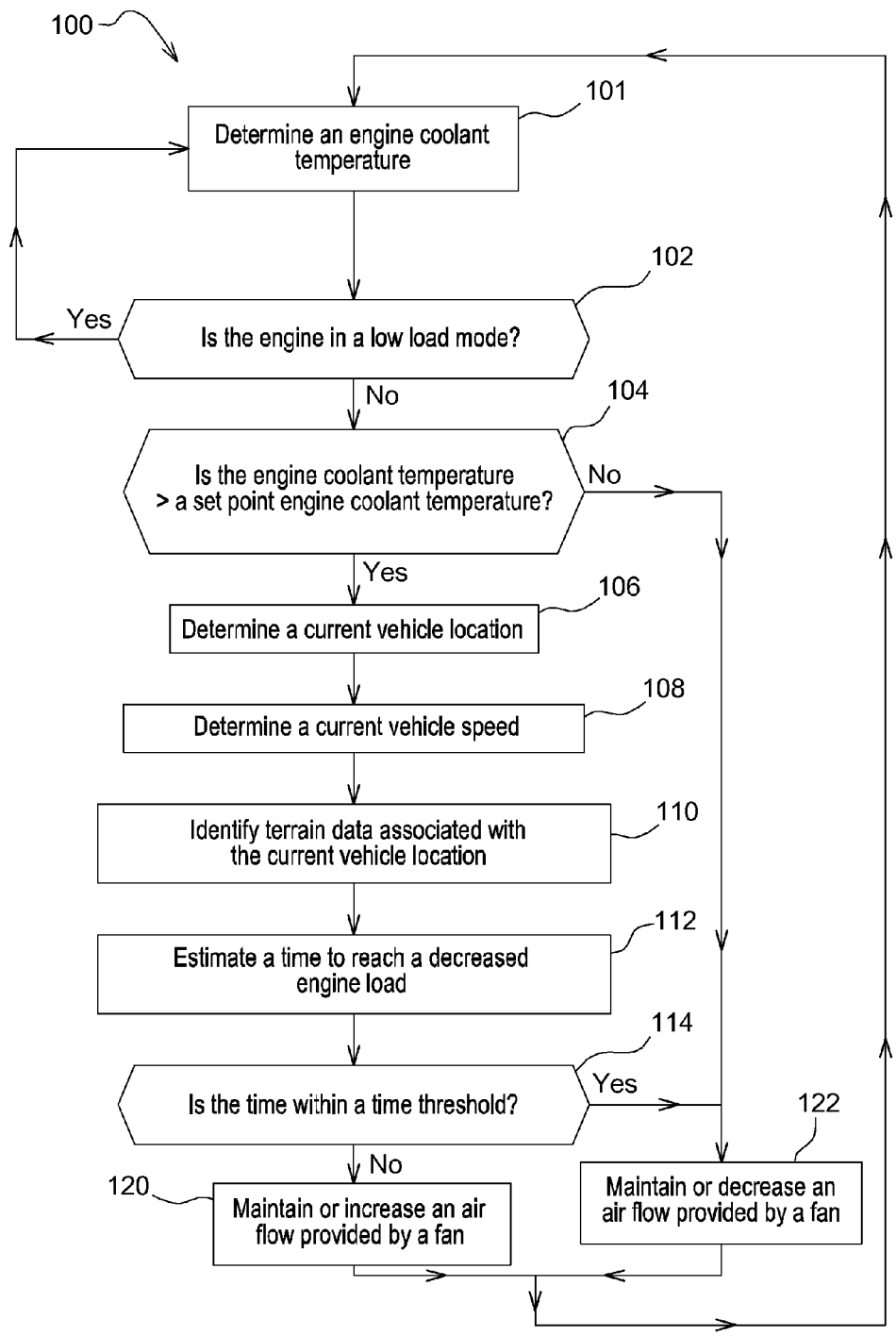
FIG. 2 is a flow chart of a first example method for controlling a fan.

A first method 100 for controlling the fan 24 of the vehicle 10 is shown in FIG. 2. At step 101, the ECU 14 determines the engine coolant temperature based on a coolant temperature signal 18, associated with, for example, the temperature of the coolant as it is leaving the engine 12 and entering a radiator. A temperature sensor may provide the coolant temperature data 18. The coolant temperature may need to be controlled, so as to prevent overheating of the coolant and engine 12. In some embodiments and operating modes, the coolant temperature may get so high, as to cause the engine 12 to enter into an engine derate mode (i.e., at an absolute maximum coolant temperature).

At step 102, the ECU 14 determines whether the engine 12 is in a low load mode. If the engine 12 is in a low load mode, then the ECU 14 may proceed back to step 101. A low load mode may be, for example, a mode where the engine 12 has power available for driving additional applications, such as hydraulic operations, electrical operations, cooling operations, and external work operations.

One specific example of a low load mode may be when the power required to increase the speed of the fan 24 from a current speed to a highest speed would not cause the engine 12 to exceed its rated power (and enter into a boosted power mode). To illustrate, assume that the engine 12 needs to deliver 10 kW of power to the fan 24 at its current speed and 30 kW at its highest speed, for example. In such a case, the engine 12 may be in a low load mode when it has the additional 20 kW of power to deliver to the fan 24, so as to increase its speed from its lowest speed to its highest speed. In this example, such a power increase should be possible within the rated power of the engine 12 (i.e., without entering a boosted power mode). As is known to those of ordinary skill in the art, the boosted power mode may be a mode where the engine 12 momentarily delivers power above its rated power curve.

At step 104, the ECU 14 determines whether the engine coolant temperature is greater than a threshold engine coolant temperature. The threshold engine coolant temperature may be lower than the absolute maximum coolant temperature, such as one that would cause the engine 12 to enter an engine derate mode, as discussed above. In some embodiments, the threshold engine coolant temperature may be 103° C., while the absolute maximum coolant temperature may be 113°, to name just one example. If the engine coolant temperature is less than the threshold engine coolant temperature, then the ECU 14 may maintain or decreases the fan speed (discussed further below). Alternatively, if the engine coolant temperature is greater than the threshold engine coolant temperature, then the ECU 14 may proceed to step 106.

In some embodiments, the first method 100 may proactively overcool the engine coolant during a low engine load (even if unnecessary), so as to "cool ahead" in anticipation of using less power to drive the fan 24 during a high engine load.

At step 106, the ECU 14 may determine a vehicle location based on, for example, the GPS data 16.

At step 108, the ECU 14 may determine a vehicle speed. Such a determination may be based on a vehicle speed signal 17, which may be related, for example, to how quickly gear teeth pass by a magnetic pickup in a transmission or differential of the vehicle 10. By viewing the frequency of the gear teeth passing thereby, one of ordinary skill in the art can then calculate how quickly the vehicle 10 is moving. As another example, the vehicle speed signal 17 may be associated with how quickly the ground passes underneath the vehicle 10, as viewed from a radar. Such an arrangement may be useful in vehicles that slip when moving, such as agricultural tractors. In yet another example, the vehicle speed signal 17 may be based on the GPS signal 16.

At step 110, the ECU 14 may identify terrain data 20 associated with and surrounding the current vehicle location. The terrain data 20 may include data related to hills and valleys associated with a work operation, and may indicate where the vehicle 10 may be going uphill or downhill, depending on the direction that the vehicle 10 is traveling. When traveling uphill, the vehicle 10 may be operating in a relatively high load mode. In contrast, when traveling downhill, the vehicle 10 would be operating in a relatively lower load mode, all other things equal.

The field data 21 may indicate the boundaries of a work zone, such as boundaries associated with an agricultural field, and further the field data 21 may indicate expected crop yields (based on current and/or past year yields). The boundaries of the work zone may indicate that the vehicle 10 will be in a relatively low load mode (e.g., transport or turning), while the internal regions of the work zone may indicate that the vehicle 10 will be in a high load mode (e.g., harvesting a crop). Further, the field data 21 may also indicate that the vehicle 10 is in a relatively high or low load mode, as a result of high or low crop yields respectively (e.g., high crop yields may demand high power needs, as a result of high loads). Further, the field data 21 (or the terrain data 20) may include soil condition data, such as data related to whether the soil is wet, damp, or dry.

At step 112, the ECU 14 estimates the time that it will take to reach a substantially decreased engine load. In one embodiment, it may be, for example, an engine load that is decreased 2-10% or more. In another embodiment, the substantially decreased engine load may be a decrease that then allows the engine 12 to provide power to additional applications, such as hydraulic operations, electrical operations, cooling operations, or external work operations without entering into a boosted power mode.

One specific example of a substantial decrease may be when engine load decreases to such an extent that the engine 12 has the power required to increase the speed of the fan 24 from a current speed to a highest speed, but without causing not cause the engine 12 to exceed its rated power (and enter into a boosted power mode). To illustrate, assume that the engine 12 needs to deliver 10 kW of power to the fan 24 at its current speed and 30 kW at its highest speed, for example. Further, assume that the engine 12 is at a power at or above its rated power, but it then drops enough to be 20 kW or below it rated power. With such a decrease in the engine load, the engine 12 has the additional 20 kW of power to deliver to the fan 24, so as to increase its speed from its lowest speed to its highest speed. In this example illustration, such a power increase should be possible within the rated power of the engine 12 (i.e., without entering a boosted power mode).

At step 112, the ECU 14 may predict when the vehicle 10 will reach an operating grade associated with the decreased engine load, and further, include basing the time it will take to reach the substantially decreased engine load thereon. The vehicle 10 may reach an operating grade associated with the decreased engine load when vehicle 10 transitions from going uphill to level, from level to downhill, or from uphill to downhill. The estimation at step 112 may be based on the terrain data 20, for example. So if the vehicle 10 is moving at a certain speed, from a certain location, and in a certain direction, the ECU 14 may be able to calculate the timing of such transitions, particularly when associating such data with the terrain data 20.

At step 112, the ECU 14 may predict when the vehicle 10 will reach an end of a work application that is external to the vehicle 10. And further, the estimating may include basing the time it will take to reach the decreased engine load thereon. The work operation may be a tillage age operation, a baling operation, a construction application, or a mining application, to name a few examples. The ECU 14 may be able to estimate the end of such work operations based on the vehicle 10 moving at a certain speed, from a certain location, and in a certain direction and then associating that data with the terrain data 20 and field data 21, for example.

At step 112, the ECU 14 may predict when the vehicle 10 will reach an end turn and basing the time it will take to reach the decreased engine load thereon. Such an estimate may be based on, for example, the current vehicle location, the field data 21, and the current direction that the vehicle 10 is heading. If the vehicle 10 is headed in a particular direction and at a particular speed, then the vehicle 10 may reach a boundary of a field (as may be known from the field data 21) at a particular time. By knowing all of this information, the ECU 14 may make an estimate as to the timing of an end turn, wherein the vehicle 10 then proceeds in an opposite direction and parallel to the previous pass through the field. At the end turn, the power consumption of the vehicle 10 may decrease, as a result of tillage equipment or harvesting equipment demanding less power at this time.

In some embodiments, at step 112, the estimating of when the vehicle 10 will reach an end turn may be based on a plurality of automated vehicle movements and a plurality of known future vehicle locations. Automated vehicle movements and known future vehicle locations may be provided by systems such as, or similar to, John Deere's AutoTrac.

At step 112, the ECU 14 may also predict when the vehicle 10 will reach an end of a harvesting related operation and basing the time it will take to reach the substantially decreased engine load thereon. The harvesting operation may be related to an unloading operation or a separating operation, such as those related to corn, soybeans, or cotton, to name just a few examples. The end of a harvesting related operation may be predicted based on the field data 21 and based on sensors on the vehicle 10 (e.g., sensors sending signals related to how much grain is on an agricultural combine).

At step 114, the ECU 14 may determine whether the time is with a threshold. The threshold is an amount of time based on the overall vehicle design and may be, for example, as little as a few seconds or as long as a few minutes.

At steps 120 and 122, the ECU 14 may control an operating characteristic of the fan 24 based on whether the time is within the threshold.

For example, as shown at step 120, the ECU 14 may maintain or increase an air flow provided by the fan 24 if the time is outside of the threshold. In some modes, the air flow may be maintained due to the fan 24 already providing a maximum air flow, as a result of mechanical or electrical limits, for example. In some other modes, the air flow of the fan 24 may be increased by increasing the speed and/or blade pitch thereof. This may prevent damage to the engine 12 or prevent an engine derate mode. The threshold may as short as a few seconds or as long a few minutes, depending on the cooling needs of the vehicle 10 and the engine 12.

Alternatively, as shown at step 122, the ECU 14 may maintain or decrease an air flow provided by the fan 24 if the time is within the threshold. In some modes, the air flow may be maintained due to the fan 24 already providing a minimum air flow, as a result of mechanical or electrical limits, for example. In some other modes, the air flow of the fan 24 may be decreased by decreasing the speed and/or blade pitch thereof. Decreasing the fan speed and/or blade pitch may decrease the load on the engine 12. This may allow the engine 12 to provide power to other applications and may improve fuel economy.

Following steps 120 and 122, depending on which is utilized, the ECU 14 may repeat the first method 100 until, for example, the vehicle 10 is shut down.

Figure 3:
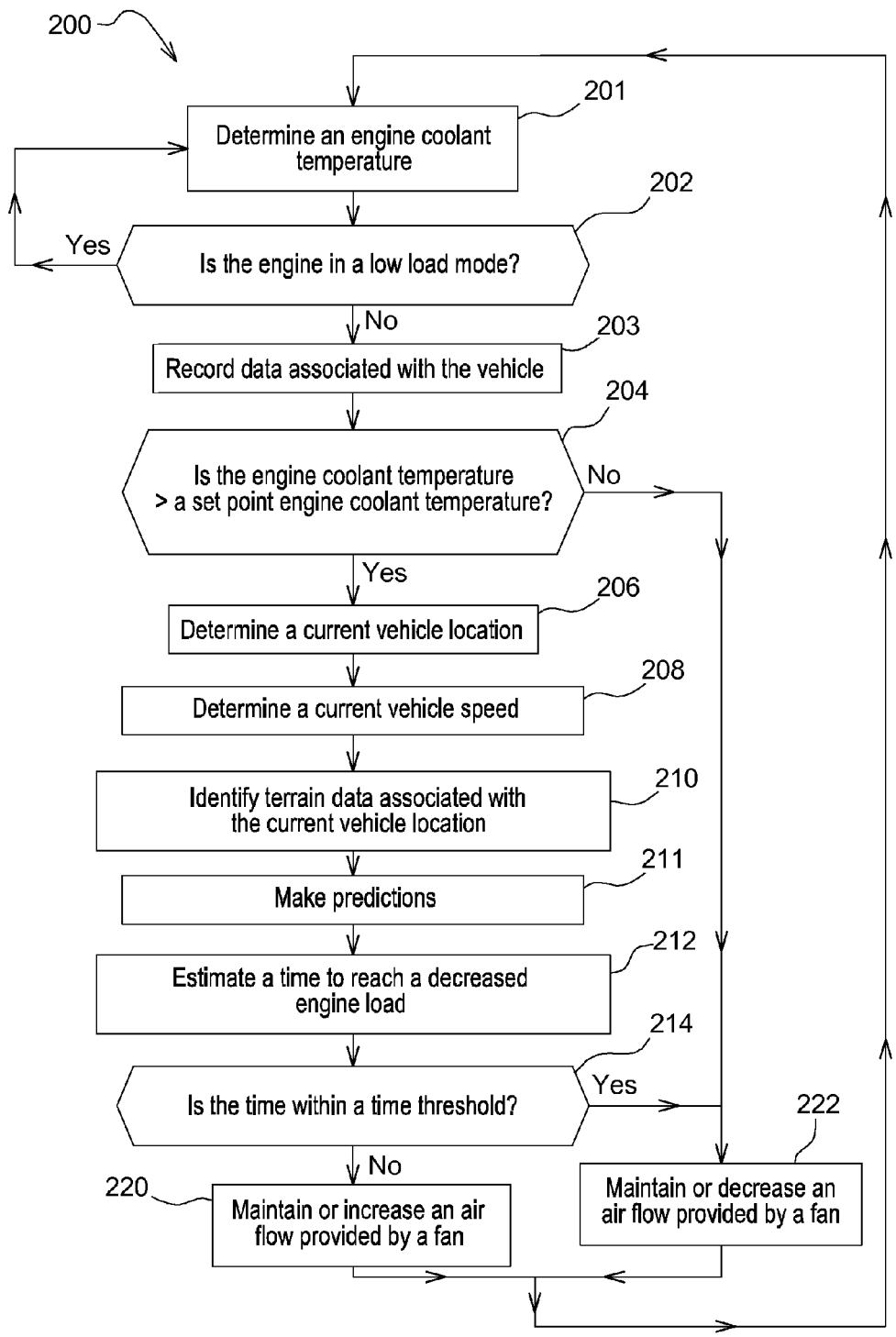
FIG. 3 is a flow chart of a second example method for controlling the fan.

Referring to FIG. 3, there is shown a second method 200 for controlling the fan 24 of the vehicle 10. The steps of the second method 200 that are similar to steps in the first method 100, utilize similar numbers, but are 100 higher (e.g., 112 and 212 are similar steps).

In step 203, the ECU 14 may record data. For example, the ECU 14 may record data associated with a plurality of vehicle locations, such as where a vehicle 10 has recently been in operation. The ECU 14 may also record data associated with a plurality of vehicle speeds associated with a plurality of vehicle locations. In the case of an agricultural combine, as shown in FIG. 1, it may operate by going back-and-forth through a field. As viewed from above, it may go up one row and then go down the next, parallel row. Such movements may be repeated throughout an entire agricultural field. Recording the vehicle locations may be useful when field data 21 is unavailable (e.g., when the field and its boundaries have never been mapped) and when such locations are repetitive and systematic.

Still further, the ECU 14 may record terrain data 20 associated with the plurality of vehicle locations. The terrain data 20 may also be based on the GPS data 16, particularly terrain data 20 that is related to rises in falls in an agricultural field or on a work site. In the case of the agricultural combine, as shown in FIG. 1, it may travel up and down hills. The ECU 14 may record this up and down movement by utilizing the GPS signal 16, for example. As the agricultural combine moves through the field, the topography of the field can be mapped. Recording the terrain data 20 may be particularly useful when the terrain data 20 is unavailable (e.g., when the terrain data 20 has have never been mapped).

At step 203, the ECU 14 may also record field data 21 associated with the plurality of vehicle locations. For example, sensors on the vehicle 10 may monitor grain yields and associate those yields with the plurality of vehicle locations.

At step 211, the ECU 14 may predict future vehicle locations based on the plurality of vehicle locations. If the vehicle 10 is going back-and-forth in a field, then the ECU 14 may be able to extrapolate that information when predicting the location of future passes. Or, as another example, if the vehicle 10 is going back-and-forth repeatedly between two or more points, then the ECU 14 may extrapolate that information when predicting the location of future passes.

At step 211, the ECU 14 may predict future terrain data associated with the predicted future vehicle locations. If the vehicle 10 is going back-and-forth a field, as discussed above, then the ECU 14 may be able to extrapolate the terrain over to the next pass through the field. For example, if one pass of the vehicle 10 is traveling slightly uphill at a given location, then the ECU 14 may be able to estimate that the vehicle 10 will be traveling slightly downhill when traveling beside the location on the next pass.

At step 211, the ECU 14 may predict future vehicle speeds and crop yields. Such predictions may be associated with the predicted future vehicle locations and terrain data 20. The ECU 14 may be able to predict the future vehicle speeds and crop yields based on previous passes through a field, for example. Further, at step 211, the ECU 14 may predict future engine loads based on the predicted future vehicle locations, predicted future terrain data, predicted future vehicle speeds, and predicted future crop yields.

For example, if the vehicle 10 is going back-and-forth through a field, then the ECU 14 may be able to estimate that the vehicle 10 will continue to make such passes.

At step 212, the ECU 14 may estimate a time to reach the decreased engine load based on the predictions made in step 211. At step 214, the ECU 14 may determine whether the time is with a threshold and proceed to either step 220 or 222, depending on the answer thereof. Following either step 220 or 222, depending on which is utilized, the ECU 14 may repeat the second method 200 until, for example, the vehicle 10 is shut down.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A method of controlling a fan, the method comprising:
   estimating a time for an engine to reach a substantially decreased engine load relative to a current engine load;
   determining whether the time to reach the substantially decreased engine load is within a threshold; and
   controlling a fan operating characteristic based on whether the time is within the threshold.

2. The method of claim 1, wherein the controlling comprises maintaining or decreasing an air flow provided by the fan if the time is within the threshold.

3. The method of claim 1, wherein the controlling comprises maintaining or increasing an air flow provided by the fan if the time is outside of the threshold.

4. The method of claim 1, wherein:
   the estimating comprises predicting when a vehicle will reach an operating grade associated with the substantially decreased engine load and basing the time thereon; and
   the controlling comprises maintaining or decreasing an air flow provided by the fan if the time is within the threshold.

5. The method of claim 1, wherein:
   the estimating comprises predicting when a vehicle will reach an end turn and basing the time thereon; and
   the controlling comprises maintaining or decreasing an air flow provided by the fan if the time is within the threshold.

6. The method of claim 1, wherein:
   the estimating comprises predicting when a vehicle will reach an end of a work application that is external to the vehicle and basing the time thereon; and
   the controlling comprises maintaining or decreasing an air flow provided by the fan if the time is within the threshold.

7. The method of claim 1, wherein the estimating is based on a plurality of automated vehicle movements and a plurality of known future vehicle locations.

8. The method of claim 1, wherein:
   the estimating comprises predicting when a vehicle will reach an end of a harvesting related operation and basing the time thereon; and
   the controlling comprises maintaining or decreasing an air flow provided by the fan if the time is within the threshold.

9. The method of claim 8, wherein the harvesting related operation is an unloading operation.

10. The method of claim 8, wherein the harvesting related operation is a separating operation.

11. The method of claim 1, wherein the estimating comprises:
    determining a current vehicle location; and
    identifying terrain data and field data associated with the current vehicle location.

12. The method of claim 11, wherein the field data comprises crop yield data.

13. The method of claim 12, wherein the crop yield data is based on past harvest data.

14. The method of claim 11, wherein at least one of the terrain data and the field data comprises soil condition data.

15. The method of claim 1, wherein the estimating comprises:
    recording a plurality of vehicle locations;
    predicting future vehicle locations based on the plurality of vehicle locations;
    predicting future engine loads associated with the predicted future vehicle locations; and
    basing the time on the predicted future engine loads associated with the predicted future locations.

16. The method of claim 15, wherein the predicted future vehicle locations are based on identified back-and-forth vehicle locations on a work site.

17. The method of claim 16, wherein the back-and-forth vehicle locations are parallel to one another.

18. The method of claim 15, wherein the estimating comprises:
    recording terrain data associated with the plurality of vehicle locations;
    predicting future terrain data associated with the predicted future vehicle locations;
    predicting future engine loads associated with the predicted future terrain data; and
    basing the time on the predicted future engine loads associated with the predicted future vehicle locations.

19. The method of claim 18, wherein the estimating comprises:
    recording vehicle speeds associated with the plurality of vehicle locations; and
    predicting future vehicle speeds associated with the predicted future vehicle locations and the predicted future terrain data.

20. The method of claim 18, wherein the estimating comprises:
    recording crop yields associated with the plurality of vehicle locations; and
    predicting future crop yields associated with the predicted future vehicle locations and the predicted future terrain data;
    predicting future engine loads associated with the predicted future terrain data; and
    basing the time on the predicted future engine loads associated with the predicted future terrain data.

* * * * *